United States Patent
Souvandy

(10) Patent No.: US 9,797,566 B2
(45) Date of Patent: Oct. 24, 2017

(54) SELF-POWERED STREET LIGHT

(71) Applicant: Chauvin Souvandy, Riveria Beach, FL (US)

(72) Inventor: Chauvin Souvandy, Riveria Beach, FL (US)

( * ) Notice: Subject to any disclaimer, the term of this patent is extended or adjusted under 35 U.S.C. 154(b) by 0 days.

(21) Appl. No.: 14/870,998

(22) Filed: Sep. 30, 2015

(65) Prior Publication Data
US 2017/0089533 A1   Mar. 30, 2017

(51) Int. Cl.
F21S 9/04       (2006.01)
F21S 9/03       (2006.01)
F21Y 101/02   (2006.01)

(52) U.S. Cl.
CPC .......... *F21S 9/037* (2013.01); *F21S 9/04* (2013.01); *F21Y 2101/02* (2013.01)

(58) Field of Classification Search
CPC .... F21S 8/04; F21S 8/086; F21S 9/026; F21S 9/032; F21S 9/037; F21S 8/085; F21S 9/035; F21S 9/04; F21S 13/10; F21S 9/043; F21S 9/02; F21S 9/03; F21V 21/116; F21V 29/004; F21V 29/50; F21W 2131/103; F21Y 2103/10; F21Y 2105/10; H01L 31/042; H01L 31/04; H02S 40/38; H02S 10/10; H02S 10/30; H02S 10/40; F21L 4/08

See application file for complete search history.

(56) References Cited

U.S. PATENT DOCUMENTS

| | | |
|---|---|---|
| 4,200,904 A | 4/1980 | Doan |
| 7,615,884 B2 | 11/2009 | McMaster |
| 7,976,180 B1 * | 7/2011 | Haun ............ F21S 8/086 362/153.1 |
| 8,432,053 B2 | 4/2013 | Frayne |
| 2007/0290636 A1 * | 12/2007 | Beck ............ H02J 3/385 318/106 |

(Continued)

FOREIGN PATENT DOCUMENTS

| | | |
|---|---|---|
| CN | 102252254 | 11/2011 |
| CN | 103104877 A * | 5/2013 |

(Continued)

OTHER PUBLICATIONS

English Translation CN 103104877.*

(Continued)

*Primary Examiner* — Hargobind S Sawhney
(74) *Attorney, Agent, or Firm* — McHale & Slavin, P.A.

(57) ABSTRACT

A street lighting apparatus, and method of generating illumination, designed to provide illumination without the use of an electrical grid, is described. The illumination device is designed to have a first component configured to generate power for a second component, wherein the second component powers one or more functional elements, such as an LED or camera. The first component relies on at least one photovoltaic panel and solar power to electrically charge a first battery. The first battery is operatively coupled to a second component having a generator which is driven by a motor. The generator provides for an electrical charge to be stored in one or more batteries of a battery bank, thereby providing the necessary power utilized by the LED, camera, or other functional components.

15 Claims, 3 Drawing Sheets

(56) References Cited

U.S. PATENT DOCUMENTS

| | | | |
|---|---|---|---|
| 2008/0115414 A1* | 5/2008 | Hogan | A01G 27/003 47/66.6 |
| 2010/0088032 A1* | 4/2010 | Nielsen | G06Q 10/06 702/5 |
| 2010/0220467 A1 | 9/2010 | Daidone et al. | |
| 2010/0264732 A1* | 10/2010 | Beck | H02J 7/35 307/24 |
| 2013/0322063 A1* | 12/2013 | Tittle | H01L 31/0422 362/183 |
| 2014/0285123 A1 | 9/2014 | Tomlinson | |
| 2015/0021913 A1 | 1/2015 | Lee et al. | |
| 2015/0161860 A1 | 6/2015 | Pringle et al. | |

FOREIGN PATENT DOCUMENTS

| | | | |
|---|---|---|---|
| CN | 203086816 U | * | 7/2013 |
| CN | 104075226 A | * | 10/2014 |
| EP | 2110549 | | 10/2009 |
| KR | 100900032 | | 6/2009 |
| TW | 311174 | | 6/2009 |

OTHER PUBLICATIONS

Ayre, J., "First autonomous public lighting system that runs on solar + wind energy developed", Clean Technica, Internet article: http://cleartechnica.com/2015/01/25/first-autonomous-public-lighting-system-runs-solar-wind-energy-developed, (Jan. 25, 2015).

Anonymous, "Solar wind hybrid LED street light", Eco$mart, Inc., Internet article: http://eco-smart.org/productdocs/1-LED-solar-wind--hybrid-street-light-specs-overview.pdf, (retrieved Jul. 16, 2015).

Anonymous, "Wind solar hybrid street lighting", Guangzhou HY Energy Technology Co. Ltd, Internet article: http://www.hyenergy.com.cn/Solutions.asp?id=753 (2008).

Anonymous, "Wind solar hybrid system for telecom tower", Guangzhou HY Energy Technology Co. Ltd, Internet article: http://www.hyenergy.com.cn/Solutions.asp?id=749 (2008).

* cited by examiner

SELF-POWERED STREET LIGHT

FIELD OF THE INVENTION

The present invention relates to street lighting; to an apparatus and method for self-generation of light; and more particularly, to an LED street lamp which produces light using solar panels and a self-generating power loop to provide light to an area without the use of an electrical grid.

BACKGROUND OF THE INVENTION

Street light devices are a vital component in modern society. Without such devices, streets and public areas would be dark and dangerous. Street lights, therefore, allow individuals the ability to operate when natural sunlight is not available. Public lighting systems, such as street lamps, typically rely on commercial power grids to supply the necessary energy to provide light.

Street lights using solar power panels which are known in the art are exemplified by U.S. Pat. No. 4,200,904 ('904 patent). The system described in the '904 patent uses solar panels and wind generators. The solar panels are described as being connected in such a manner to charge a maintenance-free storage battery with sufficient capacity to light street lights and/or traffic signals. An auxiliary generator having a wind driven vane is also described for use if sufficient sun light is not available.

While such system uses solar panels to charge a battery, they lack a capability that utilizes solar power to drive a secondary power generating source electrically coupled to a batter bank configured to drive one or more functional components.

SUMMARY OF THE INVENTION

The present invention is directed towards a street lighting apparatus, and method of generating illumination, designed to provide illumination without the use of an electrical grid. The illumination device is designed to have a first component configured to generate power for a second component, wherein the second component powers one or more functional elements, such as an LED or camera. The first component relies on a photovoltaic panel and solar power to electrically charge a first battery. The first battery is operatively coupled to a second component generator which is driven by a motor. The generator is electrically charged to one or more batteries of a battery bank, thereby providing the necessary power utilized by the LED, camera, or other functional components.

In one illustrative embodiment, the illumination device comprises a housing unit configured to store one or more internal components; at least one photovoltaic panel operatively coupled to a first battery, a motor, said motor driven by electrical charge supplied by said battery and operatively coupled to a generator, a battery bank comprising of at least three batteries linked together; and at least one illumination device. At least one battery of the battery bank supplies electrical charge to the illumination device, or at least one battery of the battery bank supplies electrical charge to the other batteries of the battery bank. If needed, the one battery of the battery bank can be operatively coupled to the first battery.

Accordingly, it is an objective of the present invention to teach a street lighting apparatus designed to provide illumination without the use of an electrical grid.

It is a further objective of the present invention to teach a street lighting apparatus designed to provide illumination without the use of an electrical grid using a solar power driven component and a motor driven component.

It is yet another objective of the present invention to teach a street lighting apparatus designed to provide illumination without the use of an electrical grid wherein a solar power driven component provides a mechanism to drive a motor driven component.

It is a still further objective of the invention to teach a street lighting apparatus designed to provide illumination without the use of an electrical grid which uses a battery bank.

It is a further objective of the present invention to teach a street lighting apparatus designed to provide illumination without the use of an electrical grid wherein a solar power driven component provides a mechanism to provide electrical charge to a battery bank.

It is yet another objective of the present invention to teach a street lighting apparatus designed to provide illumination without the use of an electrical grid wherein a solar power driven component provides a mechanism to provide electrical charge to a battery bank, wherein the battery bank serves to provide a source of electrical power for one or more street light functioning components.

It is a still further objective of the invention to teach a street lighting apparatus designed to provide illumination without the use of an electrical grid wherein a solar power driven component provides a mechanism to provide electrical charge to a battery bank, wherein the battery bank serves to provide a source of electrical power for one or more street light functioning components such as an illumination device.

It is a further objective of the present invention to teach a street lighting apparatus designed to provide illumination without the use of an electrical grid wherein a solar power driven component provides a mechanism to provide electrical charge to a battery bank, wherein the battery bank serves to provide a source of electrical power to an LED light, a camera, a device for boosting cellular phone technology signals, an electrical guide, or a sensor.

It is yet another objective of the present invention to teach a street lighting apparatus designed to provide illumination without the use of an electrical grid wherein a solar power driven component provides a mechanism to provide electrical charge to a battery bank, wherein the battery bank serves to provide a source of electrical power to a camera.

It is a still further objective of the invention to provide a method of illuminating an area without the use of an electrical grid using a street lighting apparatus designed to use a battery electrically charged by solar power and a battery bank electrically charged by a mechanical mechanism powered by the solar powered battery bank.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
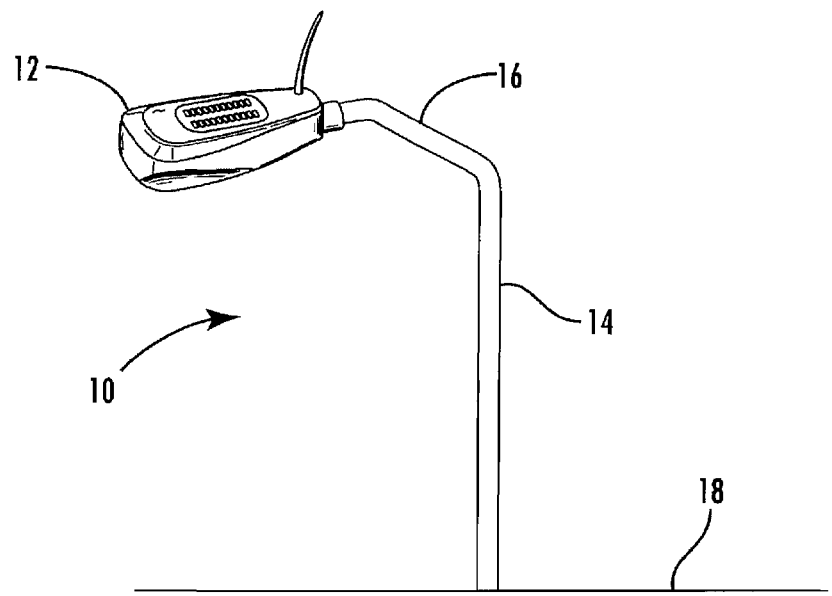
FIG. 1 is an illustration of an embodiment of the self-powered street light assembly.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIG. 1, a lighting system is shown. The lighting system comprises a lighting apparatus, referred to generally as a street lamp 12, coupled to an elongated, vertical support structure 14 through a horizontal support structure 16. The vertical support structure 14 is sized to position the street lamp 12 at a predetermined distance above a surface 18. The elongated, vertical support structure 14 or the horizontal support structure 16 may be made of carbon steel. Alternatively, these structures may be made of other materials, such as wood. Surface 18 can be, for example, a city street, sidewalk, or a surface of a parking lot. In this arrangement, the street lamp 12 is designed to provide illumination towards the surface 18, thereby lighting the surrounding area.

Figure 2:
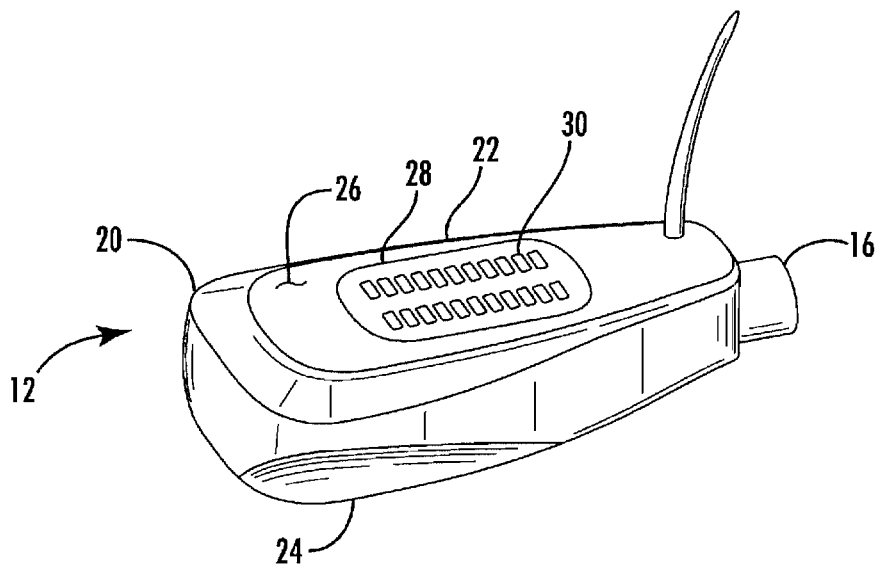
FIG. 2 is a top perspective view of the self-powered street light.
Figure 3:
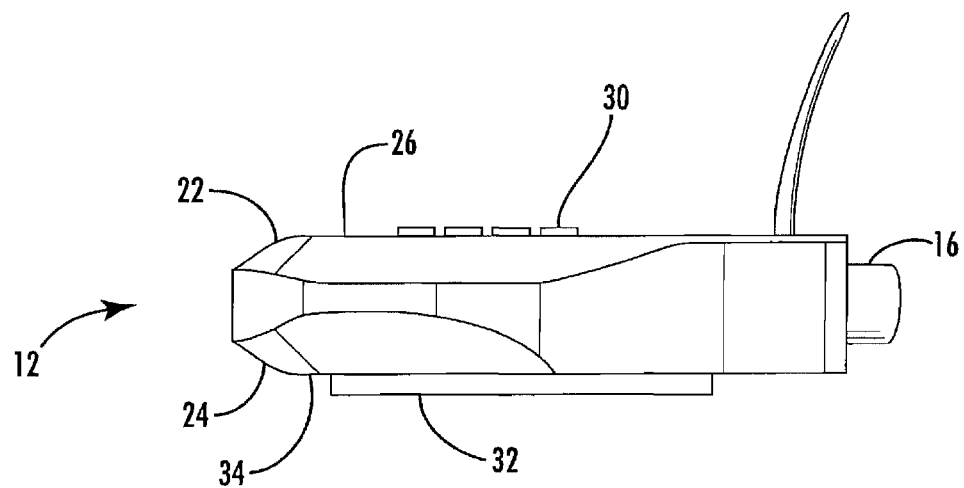
FIG. 3 is a side view of the self-powered street light.
Figure 4:
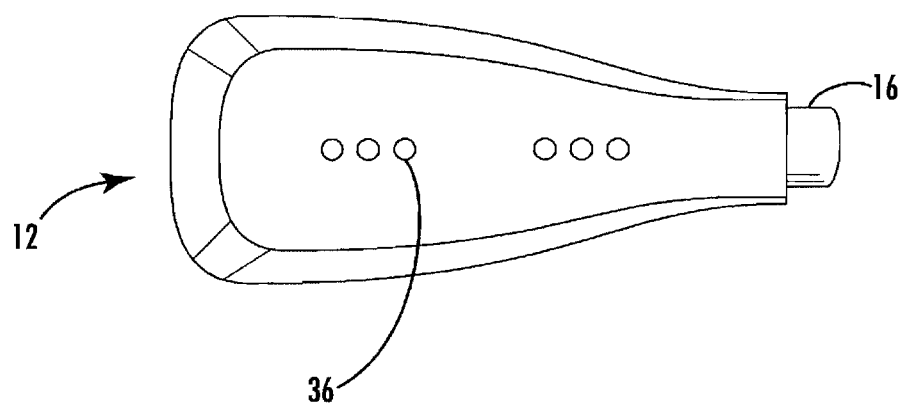
FIG. 4 is a bottom view of the self-powered street light.

Referring to FIGS. 2-4, an illustrative embodiment of the street lamp 12 is shown. The street light 12 comprises an outer casing 20 sized and shaped to receive and store the internal components that allow the street lamp 12 to function. The outer casing 20 may be made of a hard plastic material, a metal, or combinations therefore. Such material(s), however, is illustrative only and any other material can be used. The outer case 20 may be provided as a single unit. Alternatively, the outer case 20 may be constructed having a first top portion 22 securable to a second bottom portion 24. This allows the outer casing 20 to be easily separated, thereby allowing an individual the ability to remove or replace one or more internal components. An upper surface 26 contains one or more photovoltaic solar panels 28 containing solar cells 30. The photovoltaic solar panels may be, for example, a polycrystalline solar panel with built in diodes. Solar cells 30 may be, for example, wafer-based crystalline silicon cells or thin-film cells based on cadmium telluride or silicon.

The street light 12 may further contain an illumination cover 32 positioned on the lower surface 34, see FIG. 3. The illumination cover 32 covers one or more lighting units, illustrated herein as light emitting diodes (LEDs) 36, see FIG. 4. The illumination cover 32 preferably is made of a transparent or translucent material to allow light generated to be dispersed outwardly.

Figure 5:
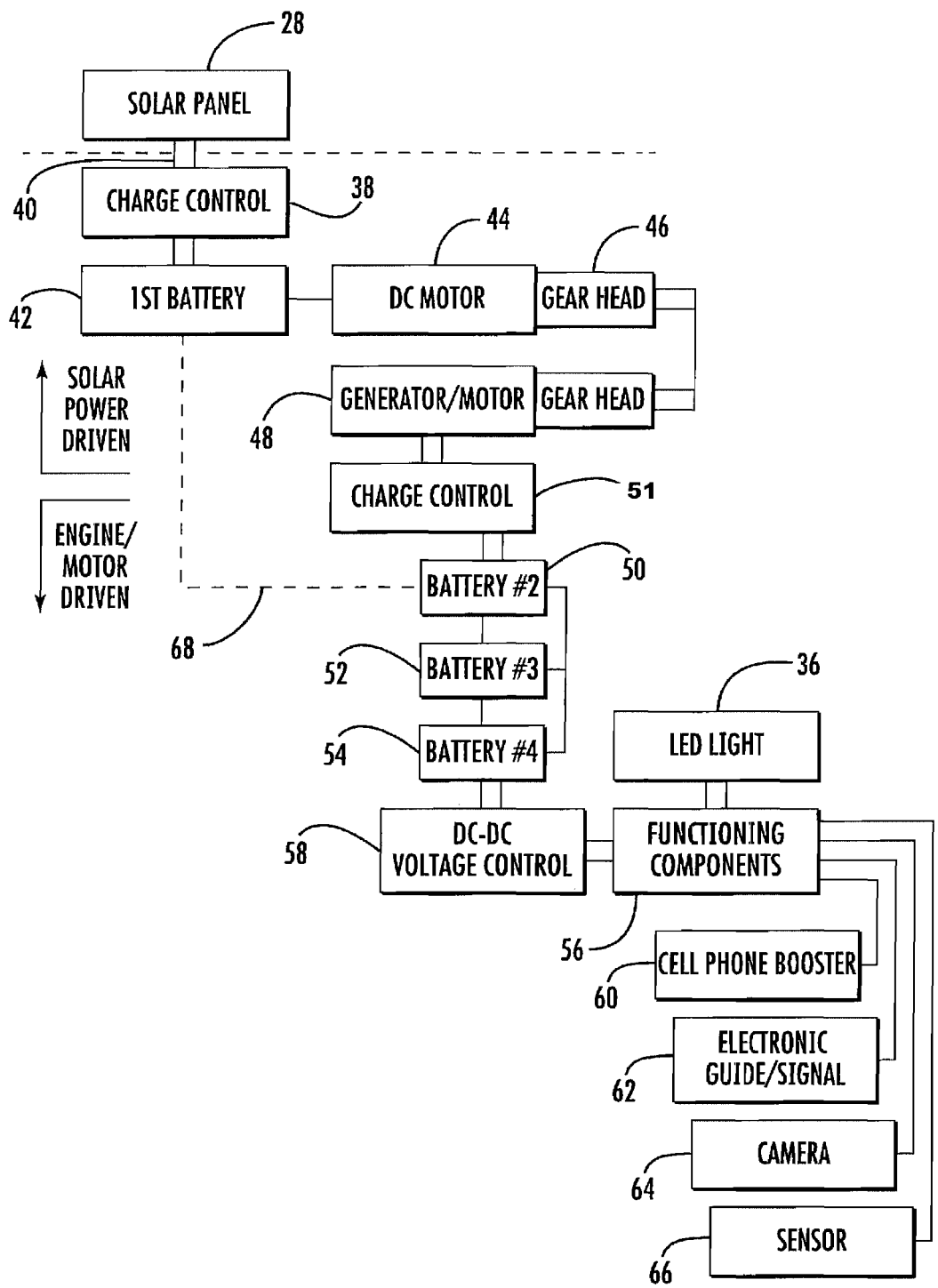
FIG. 5 is a schematic representation of the internal components of the self-powered street light.

FIG. 5 is a schematic illustration of the various internal components that drive the street lights 12 functionality. The solar panel 28 is operatively coupled to a charge control unit 38 via wires 40. The charge control unit 38 is configured to control the amount of power supplied or charged to a first battery 42. The first battery may be, for example, a 12V (5 AH to 10 AH) crank battery. The first battery 42 is operatively coupled to a DC motor 44 attached to a gear head 46. In this manner, the first power generating loop is driven by sunlight. The power from the first battery 42, obtained by the conversion of solar energy to direct current electricity, drives generator 48. The generator 48 may be, for example, a mini wind generator motor maxi 130V DC. Engine or motor driven power loop starts by the generation of electricity by the generator 48. Such electrical energy is stored to a first battery of a series of interconnected batteries, referred to as a battery bank, labeled battery number 2, as indicated by indicator number 50. The amount of charge to the battery 50 is controlled by a second charge control unit 51.

The series of interconnected batteries includes two additional back-up batteries, number 3 battery, 52, and number 4 battery 54. The number 2 battery 50 provides for charging capability to charge number 3 battery 52, which in turn charges number 4 battery 54. Each of the batteries of the battery bank may also be, for example, a 12V (5 AH to 10 AH) crank battery. This loop allows for at least two battery back-ups. The number 4 battery 54 is then used to power additional functional components 56 through a DC-DC voltage control unit 58. One of the functional components 56 is the light source, shown as LED 36. In periods of low to no sunlight, the number 2 battery 50 may be used to charge the first battery 42, see dotted line 68. Battery 54 may also be used to power a cell phone booster 60. The street light 12 may optionally include one or more of an electrical guide signal generator 62, a camera 64, or a sensor 66. The camera 64 may be a high definition camera or a closed circuit television (CCTV) camera. The sensor 66 may be a photosensitive sensor which allows the street light 12 to illuminate at no or low levels of light. In this case, the street light 12 may be operational at a time period between at, or near dusk and at, or near dawn.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An illumination device that provides light to an area without the use of an electrical grid comprising:
    a housing unit configured to store one or more internal components;
    at least one photovoltaic panel operatively coupled to a first battery;
    a motor, said motor driven by electrical charge supplied by said first battery and operatively coupled to a generator;
    said generator supplying power to a battery bank comprising of at least three batteries linked together; and
    at least one illumination device configured to receive a power supply from said battery bank.

2. The illumination device that provides light to an area without the use of an electrical grid according to claim 1 wherein said at least one illumination device is an LED.

3. The illumination device that provides light to an area without the use of an electrical grid according to claim 1 wherein at least one battery of said battery bank supplies electrical charge to said illumination device.

4. The illumination device that provides light to an area without the use of an electrical grid according to claim 1 wherein at least one battery of said battery bank supplies electrical charge to said other batteries of said battery bank.

5. The illumination device that provides light to an area without the use of an electrical grid according to claim 1 wherein at least one battery of said battery bank supplies electrical charge to said first battery.

6. The illumination device that provides light to an area without the use of an electrical grid according to claim 1 further including a camera.

7. The illumination device that provides light to an area without the use of an electrical grid according to claim 1 further including a sensor.

8. The illumination device that provides light to an area without the use of an electrical grid according to claim 1 further including a device for boosting cellular phone signals.

9. The illumination device that provides light to an area without the use of an electrical grid according to claim 1 further including a first charge control linked to said first battery.

10. The illumination device that provides light to an area without the use of an electrical grid according to claim 1 further including a second charge control linked to at least one battery of said battery bank.

11. An illumination device that provides light to an area without the use of an electrical grid comprising:
    a first power generating loop driven by solar power configured to generate power driven by sunlight, said first power generating loop comprising at least one photovoltaic panel operatively coupled to a first power generating loop battery, said first power generating loop battery operatively connected to a solar power driven first motor which drives a power generator operatively connected to said solar power driven first motor, said power generator configured to supply power to one or more functioning components;
    a second power generating loop driven by a motor driven mechanism configured to generate power driven by said power generator, said second power generating loop comprising a battery bank comprising at least one battery independent of said first power generating loop battery and configured to receive electrical power generated from said power generator, said battery bank operatively connected to said one or more functioning components to drive functionality of said one or more functioning components; and
    said one or more functioning components comprising at least one illumination device.

12. The illumination device that provides light to an area without the use of an electrical grid according to claim 1 wherein said battery bank includes at least a series of 3 interconnected batteries.

13. The illumination device that provides light to an area without the use of an electrical grid according to claim 11 wherein said one or more functioning components further include a cell phone booster, a camera, a sensor, or combinations thereof.

14. The illumination device that provides light to an area without the use of an electrical grid according to claim 11 further including one or more charge or voltage controls.

15. The illumination device that provides light to an area without the use of an electrical grid according to claim 11 wherein said at least one illumination device is an LED light.

* * * * *